Aug. 27, 1935. H. E. TURNER 2,012,646
VEHICLE SIGNAL
Filed Jan. 11, 1934  2 Sheets-Sheet 1
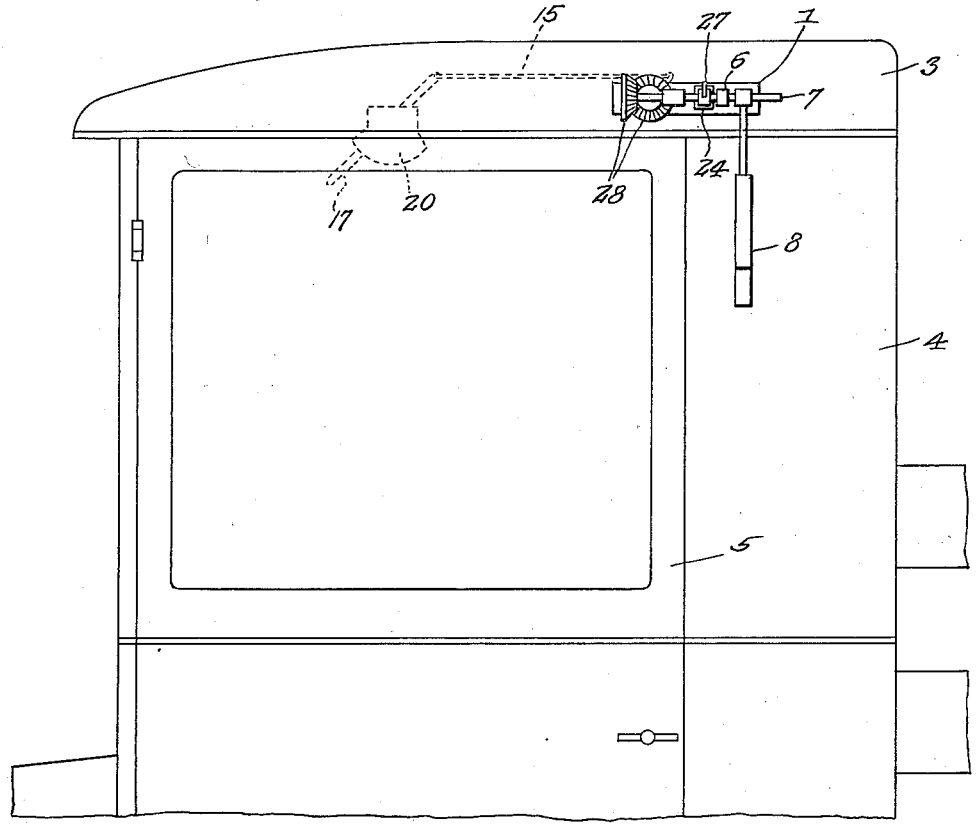
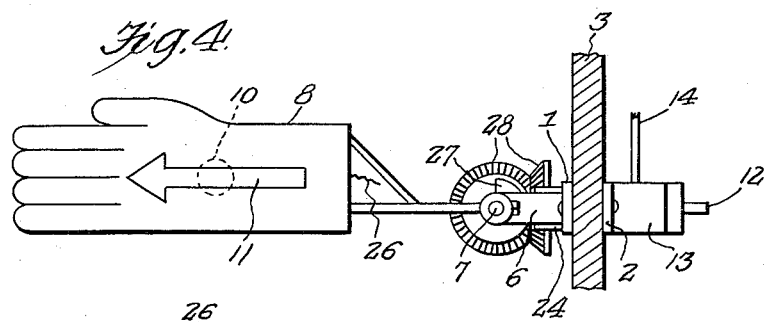
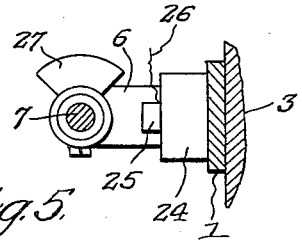
Inventor
*Henry E. Turner,*
By *Clarence A. O'Brien,*
Attorney

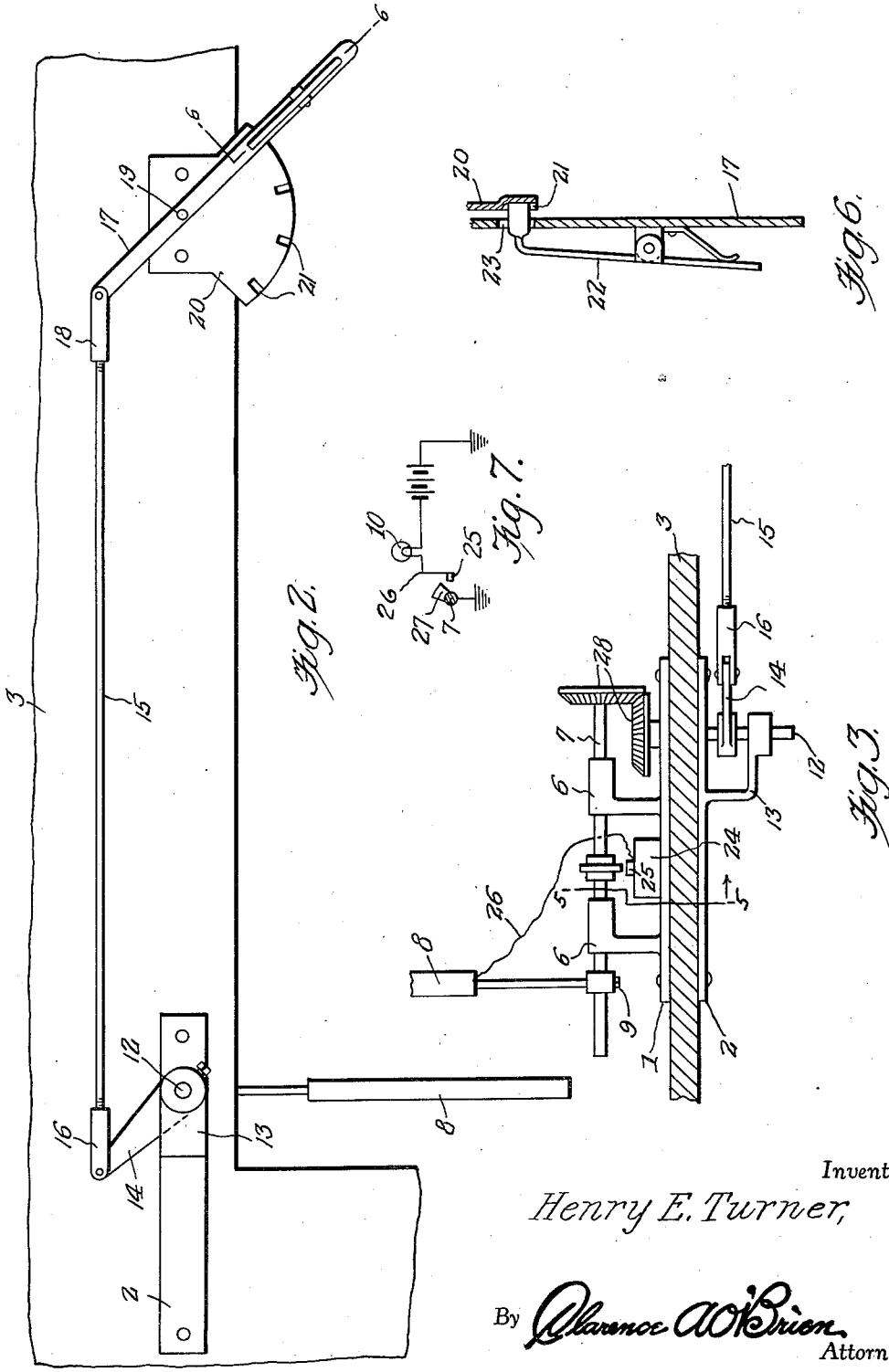

Patented Aug. 27, 1935

2,012,646

UNITED STATES PATENT OFFICE 2,012,646

VEHICLE SIGNAL

Henry E. Turner, Willows, Calif.

Application January 11, 1934, Serial No. 706,273

2 Claims. (Cl. 116—52)

The present invention relates to new and useful improvements in vehicle signals and has for one of its important objects to provide, in a manner as hereinafter set forth, a device of this character which may be conveniently operated by the driver of the vehicle without the necessity of opening the adjacent window.

Another important object of the invention is to provide a vehicle signal of the illuminated type embodying novel means for automatically closing the circuit when the signal arm is swung to any of its operative positions.

Other objects of the invention are to provide a vehicle signal of the character described which will be comparatively simple in construction, strong, durable, highly efficient and reliable in operation, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is an elevational view, looking at the outer side of a vehicle signal constructed in accordance with the present invention.

Figure 2 is an elevational view, looking at the inner side of the invention.

Figure 3 is a top plan view of a portion of the invention.

Figure 4 is a view in rear elevation.

Figure 5 is a view in vertical transverse section, taken substantially on the line 5—5 of Figure 3.

Figure 6 is a fragmentary view in section, taken substantially on the line 6—6 of Figure 2.

Figure 7 is a diagrammatic view of the electric circuit of the signal.

Referring now to the drawings in detail, it will be seen that the embodiment of the invention which has been illustrated comprises a pair of metallic plates 1 and 2 which are secured on opposite sides of the panel 3 of the vehicle cab or body 4 above the left hand door 5. Projecting outwardly from the outer plate 1 is a pair of spaced brackets 6 in which a longitudinal shaft 7 is journaled. The reference numeral 8 designates a signal arm which is adjustably secured on one end portion of the shaft 7 by suitable means, such as a set screw 9. The signal arm 8 is of hollow construction and has mounted therein one or more incandescent lamps 10. The rear face of the signal arm 8 has formed therein an arrow 11 while the front of said signal arm may be provided with an amber window.

Journaled transversely in the plates 1 and 2 is a shaft 12 which, of course, passes through the panel 3 of the vehicle body. The shaft 12 extends inwardly from the plate 2 and has its inner end portion journaled in an angular bracket 13 on the inner plate 2. Fixed on the shaft 12, between the plate 2 and the bracket 13, is an arm 14 to which one end of a rod 15 is adjustably and pivotally connected by a yoke 16. The other end of the rod 15 is pivotally and adjustably connected to one end of a lever 17 by a yoke 18. The lever 17 is pivotally mounted at an intermediate point, as at 19, on a quadrant 20. The quadrant 20, which is rigidly secured on the vehicle body, is preferably in the form of a metallic plate having spaced indentations 21 in its marginal portion. The indentations 21 are for the reception of a spring actuated latch 22 which is pivotally mounted on the handle end portion of the lever 17, said lever being provided with an opening 23 (see Figure 6) in which the latch is operable. As will be apparent, the latch 22 is selectively engageable in the indentations 21 for releasably locking the signal arm 8 in the desired position.

The reference numeral 24 designates a block of insulating material which is mounted on the outer plate 1 between the brackets 6. Mounted on the insulating block 24 is a contact or brush 25 to which the ground wire 26 from the signal arm 8 is electrically connected. Fixed on the shaft 7 is a cam 27 which is engageable with the contact 25 when the signal arm 8 is swung to any of its operative positions thereby grounding the electric circuit and energizing the electric lamp or lamps 10 in said signal arm.

Briefly, the operation of the device is as follows:—

When the signal arm 8 is in inoperative or neutral position, said signal arm depends from the shaft 7 closely adjacent or parallel to the cab or body 4 of the vehicle. If the driver wishes to signal that a stop is about to be made, the lever 17 is swung forwardly until the latch 22 seats in the second indentation 21 in the quadrant 20, thereby swinging the signal arm 8 outwardly to a downwardly inclined position. It may be well to here mention that the shaft 7 is operatively connected to the shaft 12 for actuation thereby through the medium of beveled gears 28. If a left turn is to be made, the signal arm 8 is swung to a horizontal position, in which position it is retained by engagement of the latch 22 in the third indentation 21. If a right turn is to be made the signal arm 8 is swung to an upwardly inclined position and retained as long as desired by engagement of the latch 22 in the fourth indentation 21 of the quadrant 20. When the latch 22 is disengaged from the quadrant 20 the signal arm 8 returns by gravity to inoperative or neutral position adjacent the body or cab of the vehicle, in which position it is retained by engagement of the latch 22 in the first indentation 21, as seen in Figures 2 and 6 of the drawings. It will thus be seen that after the signal has been set both of the driver's hands are free for use in operating the vehicle. The cam 27, when the signal is in inoperative or neutral position, is disengaged from the contact 25. However, when the shaft 7 is rotated to swing the arm 8 outwardly to any of its signalling positions, the cam 27 engages the contact 25 for illuminating the arm 8. Of course, when the arm 8 returns to inoperative or neutral position the electric circuit is again broken. As will be understood, the lever 17 actuates the shaft 7 upon which the signal arm 8 is mounted through the rod 15, the yokes 16 and 18, the arm 14, the shaft 12 and the gears 28.

It is believed that the many advantages of a vehicle signal constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. A vehicle signal of the class described comprising a pair of plates mounted on the inner and outer sides of the vehicle body, a pair of brackets projecting from the outer plate, a shaft journaled in the brackets, a signal arm fixed on the shaft, an angular bracket projecting from the inner plate, another shaft journaled transversely in the plates and in the angular bracket, gears operatively connecting the first-named shaft to the second-named shaft for actuation thereby, an arm fixed on the second-named shaft between the inner plate and the angular bracket, a quadrant mounted in the vehicle body, a lever pivotally mounted on the quadrant, means on the lever engageable with the quadrant for releasably securing said lever in adjusted position and a rod adjustably and pivotally connected, at one end, to the arm and at its other end to the lever, said lever constituting means for manually actuating the signal arm.

2. A vehicle signal of the class described comprising a pair of plates mounted on the inner and outer sides of the vehicle body, a pair of brackets projecting from the outer plate, a shaft journaled in the brackets, a signal arm fixed on the shaft, an angular bracket projecting from the inner plate, another shaft journaled transversely in the plates and in the angular bracket, gears operatively connecting the first-named shaft to the second-named shaft for actuation thereby, an arm fixed on the second-named shaft between the inner plate and the angular bracket, a quadrant mounted in the vehicle body, a lever pivotally mounted on the quadrant, a rod adjustably and pivotally connected, at one end, to the arm and at its other end to the lever, said lever constituting means for manually actuating the signal arm, and means for releasably securing the lever against swinging movement, said means including indentations in the quadrant, and a spring actuated latch pivotally mounted on the lever and engageable selectively in the indentations, said lever having an opening therein in which the latch is operable.

HENRY E. TURNER.